United States Patent
Toader

(10) Patent No.: US 7,774,783 B2
(45) Date of Patent: Aug. 10, 2010

(54) METHOD AND APPARATUS FOR DETECTING DEADLOCKS

(75) Inventor: Fabian Toader, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1629 days.

(21) Appl. No.: 11/022,390

(22) Filed: Dec. 23, 2004

(65) Prior Publication Data

US 2006/0143610 A1 Jun. 29, 2006

(51) Int. Cl.
G06F 9/46 (2006.01)
G06F 11/00 (2006.01)
(52) U.S. Cl. .......................... 718/104; 718/100; 714/48
(58) Field of Classification Search ................ 718/100, 718/102, 104, 107; 714/38, 48
See application file for complete search history.

(56) References Cited

U.S. PATENT DOCUMENTS

| 5,590,335 | A | * | 12/1996 | Dubourreau et al. | ........ | 718/104 |
| 6,182,108 | B1 | * | 1/2001 | Williams et al. | ............ | 718/102 |
| 6,366,946 | B1 | * | 4/2002 | Christensen | ................ | 718/106 |
| 6,615,373 | B2 | | 9/2003 | Elko et al. | | |
| 6,782,537 | B1 | * | 8/2004 | Blackmore et al. | .......... | 719/313 |
| 6,941,473 | B2 | * | 9/2005 | Etoh et al. | ..................... | 726/5 |
| 7,278,057 | B2 | * | 10/2007 | Betancourt et al. | ............ | 714/38 |
| 7,496,918 | B1 | * | 2/2009 | Dice et al. | .................. | 718/100 |
| 2003/0145035 | A1 | * | 7/2003 | de Bonet | .................... | 709/102 |
| 2004/0025164 | A1 | * | 2/2004 | Ma et al. | .................... | 718/107 |
| 2004/0199734 | A1 | * | 10/2004 | Rajamani et al. | ............ | 711/163 |

* cited by examiner

Primary Examiner—Meng-Ai An
Assistant Examiner—Caroline Arcos
(74) Attorney, Agent, or Firm—Lee & Hayes, PLLC

(57) ABSTRACT

A procedure identifies multiple threads associated with a process and pauses execution of a first thread associated with the process. A determination is made regarding whether the first thread is attempting to access a first resource. If the first thread is attempting to access a first resource, the procedure identifies a second thread that has locked the first resource and determines whether the second thread is attempting to access a second resource that is locked by the first thread. A deadlock is identified if the second thread is attempting to access a second resource that is locked by the first thread.

20 Claims, 6 Drawing Sheets

METHOD AND APPARATUS FOR DETECTING DEADLOCKS

TECHNICAL FIELD

The systems and methods described herein relate to detecting and responding to deadlocks.

BACKGROUND

The normal operation of a computing device is disrupted when a deadlock occurs in, for example, the operating system, an application program, or other process running on the computing device. A deadlock is a condition that occurs when two processes are each waiting for the other process to complete before continuing. When a deadlock occurs, neither process can continue. Thus, both processes "hang".

Certain types of computing devices allow users to debug a deadlock condition. However, computing devices that do not allow users to debug a deadlock condition often require that the user clear the deadlock by terminating the process or application that is deadlocked. Valuable information may be lost when terminating the process or application in this manner. For example, information associated with the cause of the deadlock may be lost when the process or application is terminated. Loss of this information hinders the ability to modify the process or application to reduce the likelihood of future deadlocks.

Therefore, it would be desirable to provide a system that detects and responds to deadlocks in systems that do not support debugging or related operations.

SUMMARY

The systems and methods described herein detect a deadlock condition, obtain information regarding the deadlock, and report the deadlock condition before terminating one or more processes involved in the deadlock. In one embodiment, a procedure identifies multiple threads associated with a process and pauses execution of a first thread associated with the process. The procedure then determines whether the first thread is attempting to access a first resource. If the first thread is attempting to access a first resource, the procedure identifies a second thread that has locked the first resource, and determines whether the second thread is attempting to access a second resource that is locked by the first thread. The procedure identifies a deadlock if the second thread is attempting to access a second resource that is locked by the first thread.

BRIEF DESCRIPTION OF THE DRAWINGS

Similar reference numbers are used throughout the figures to reference like components and/or features.

DETAILED DESCRIPTION

The systems and methods described herein detect a deadlock condition without using any traditional debugging tools or otherwise intruding or intervening into the processes involved in the deadlock. After detecting a deadlock condition, information regarding the deadlock condition is obtained (e.g., via a memory dump) and reported to an administrator, monitoring system, or other recipient. After obtaining and reporting information regarding the deadlock, one or more processes are terminated to clear the deadlock. Typically, the deadlock is identified, reported, and cleared before a user of the system terminates the process (e.g., by terminating the application, or resetting or powering down the device).

The systems and methods described herein are useful in monitoring the status and performance of application programs and other routines executing on a computing device. These systems and methods can be implemented on any type of device operating in any type of environment.

Particular examples discussed herein refer to processes executing in an environment supported by one or more x86 architecture microprocessors from Intel Corporation of Santa Clara, Calif. However, the systems and methods discussed herein may be utilized with any type of processor in any computing environment.

Figure 1:
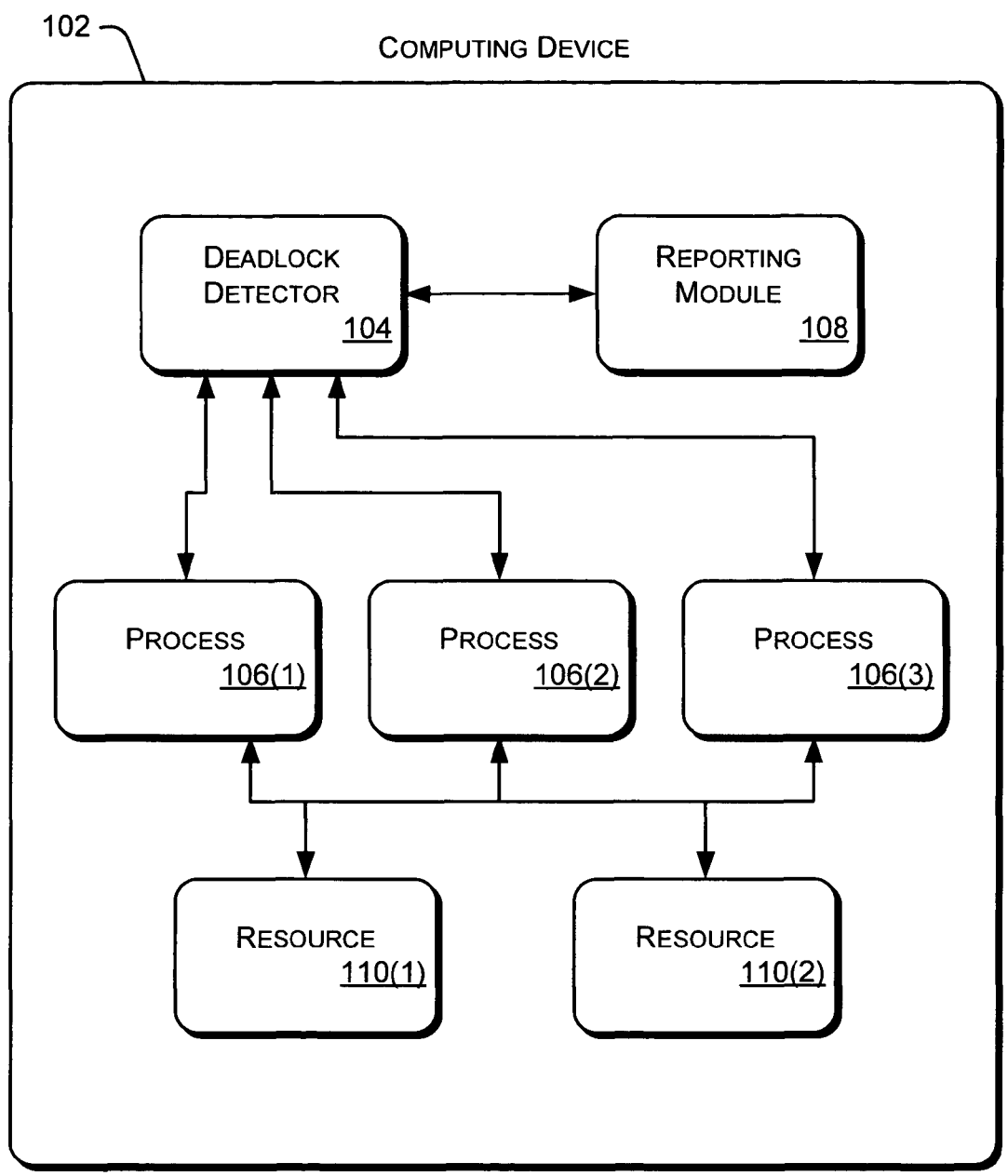
FIG. 1 is a block diagram showing selected portions of an example computing device.

FIG. 1 is a block diagram showing selected portions of an example computing device 102. Computing device 102 includes a deadlock detector 104, coupled to multiple processes 106. Deadlock detector 104 monitors the operation of processes 106. Although three processes 106 are shown in FIG. 1, a particular computing device 102 may contain any number of processes 106. Additionally, deadlock detector 104 is capable of monitoring the operation of any number of processes 106. Deadlock detector 104 is also coupled to a reporting module 108 that is capable of storing and/or reporting information (such as deadlock-related information) to another device or component (not shown).

Processes 106 are coupled to multiple resources 110. Processes 106 and deadlock detector 104 interact with resources 110, for example, to store information, retrieve information, and perform other functions. Although two resources 110 are shown in FIG. 1, a particular computing device 102 may contain any number of resources 110 accessible by processes 106 and deadlock detector 104.

As discussed in greater detail below, deadlock detector 104 monitors the operation of processes 106 and detects deadlocks in any of the processes. If a deadlock is detected, deadlock detector 104 obtains information about the deadlock, provides that information to reporting module 108, and clears the deadlock.

Figure 2:
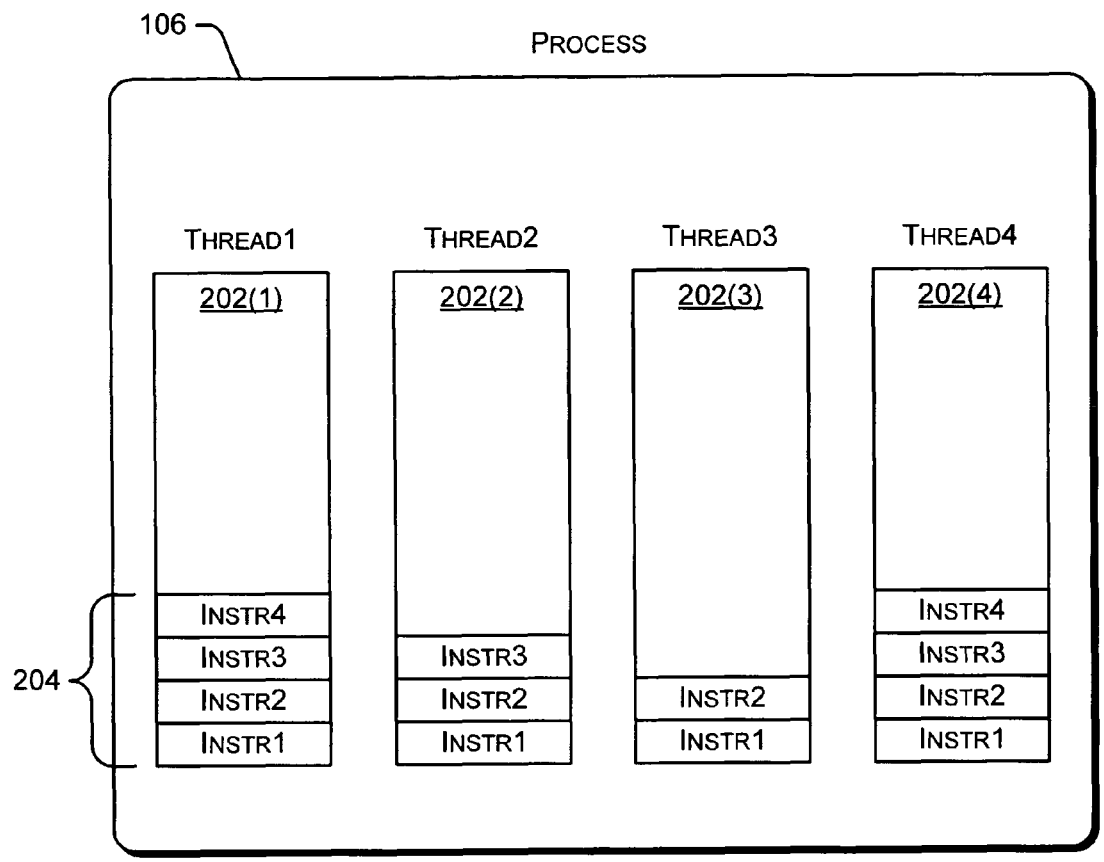
FIG. 2 illustrates an example process containing multiple threads.

FIG. 2 illustrates an example process 106 containing multiple threads 202. Each thread 202 includes a stack 204 that stores instructions being executed or awaiting execution. Although FIG. 2 shows a process 106 having four threads 202, other processes may have any number of threads. Additionally, a particular stack 204 may contain any number of instructions.

Figure 3:
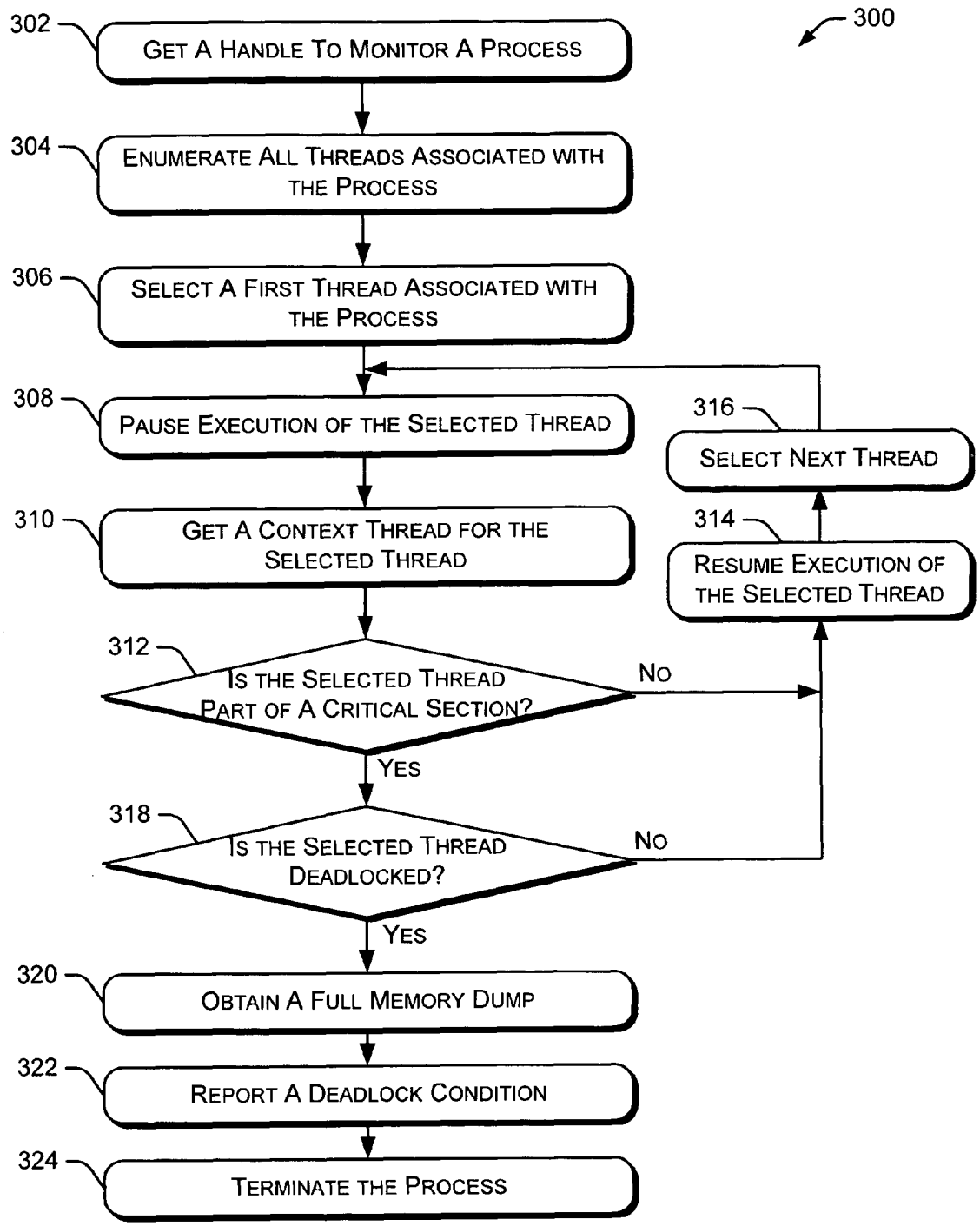
FIG. 3 is a flow diagram illustrating an embodiment of a procedure for detecting a deadlock.

FIG. 3 is a flow diagram illustrating an embodiment of a procedure 300 for detecting a deadlock. Initially, the procedure gets a handle to monitor a process (block 302). A handle can be obtained, for example, by first enumerating the current processes using an "EnumProcesses" function, which retrieves the process identifier for each process object in the system. Next, a handle is obtained to monitor a particular process using an "OpenProcess" function, which opens an existing process object. The procedure then enumerates all threads associated with the process (block 304). For example, threads associated with the process can be enumerated using an "EnumProcessModules" function, which retrieves a handle for each module/thread in the specified process. A first thread is selected from the enumerated threads associated with the process (block 306). Any thread can be the first thread selected. For example, the first thread may be the first one reported by the thread enumerator. Procedure 300 pauses execution of the selected thread (block 308) and gets a context thread for the selected thread (block 310). A context thread can be obtained by retrieving various register values (such as x86 register values).

The procedure continues by determining whether the selected thread is part of a critical section (block 312). A critical section object protects a section of code from being accessed by more than one thread. A critical section is limited to being accessed by one process and cannot be shared with other processes simultaneously. The critical section may be associated with a shared resource. If the selected thread is not part of a critical section, then a deadlock condition does not exist for the selected thread. To determine whether the selected thread is part of a critical section, procedure 300 examines, for example, a base pointer register (such as the EBP register in an x86 architecture). The EBP register is used to reference function parameters and local variables in the current stack. The EBP register is also referred to as a "frame pointer register". One of the parameters stored in the EBP register is a return address from the function call that was previously made. This return address is analyzed to determine whether the return address is part of a critical section address space.

To determine whether the return address is part of a critical section address space, the procedure first determines the address range of the critical section. For example, the function call "Get ProcAddress(kernel32.dll, RtlEnterCriticalSection())" returns the starting address for the address range of the critical section. "RtlEnterCriticalSection()" is an application program interface (API) exposed by "kernel32.dll". The size of the address range of the critical section, API (RTLEnterCriticalSection), is known based on the operating system executing the process. For example, a particular address range size is 30 bytes. Therefore, by knowing the starting address for the critical section and the size of the address range, the procedure can calculate the ending address for the critical section. If the return address value from the EBP register is within the address range bounded by the starting address and the ending address, then the selected thread is part of the critical section. If the return address value from the EBP register is outside the address range bounded by the starting address and the ending address, then the selected thread is not part of the critical section, thereby indicating that the thread is not deadlocked.

If block 312 determines that the selected thread is not part of a critical section, the procedure resumes execution of the selected thread (block 314) and selects the next thread for processing (block 316). The procedure then returns to block 308 to process the newly selected thread. If the selected thread is part of a critical section (as determined in block 312), procedure 300 then determines whether the selected thread is deadlocked (block 318). The determination of whether the selected thread is deadlocked is discussed below with respect to FIG. 4. If block 318 determines that the selected thread is not deadlocked, then the procedure will attempt to do the same kind of analysis on the next available thread. Thus, procedure 300 resumes execution of the selected thread (block 314) and selects the next thread for processing (block 316). The procedure then returns to block 308 to process the newly selected thread.

If block 318 determines that the selected thread is deadlocked, procedure 300 responds to the deadlock by obtaining a full memory dump (block 320), reporting a deadlock condition (block 322), and terminating the process in which the deadlock occurred (block 324). The information contained in the full memory dump may be used to determine the cause of the deadlock. The deadlock condition may be reported to, for example, an administrator, a monitoring system, or other person or system. The deadlock condition can be reported via a pop-up message, an instant message, an email message, or any other reporting mechanism. Alternatively, the deadlock condition may be recorded in an error log or other storage mechanism. The process in which the deadlock occurred is terminated at block 324 to clear the deadlock. In this example, the memory dump is completed prior to terminating the process to preserve the information that may be useful in determining the cause of the deadlock.

Figure 4:
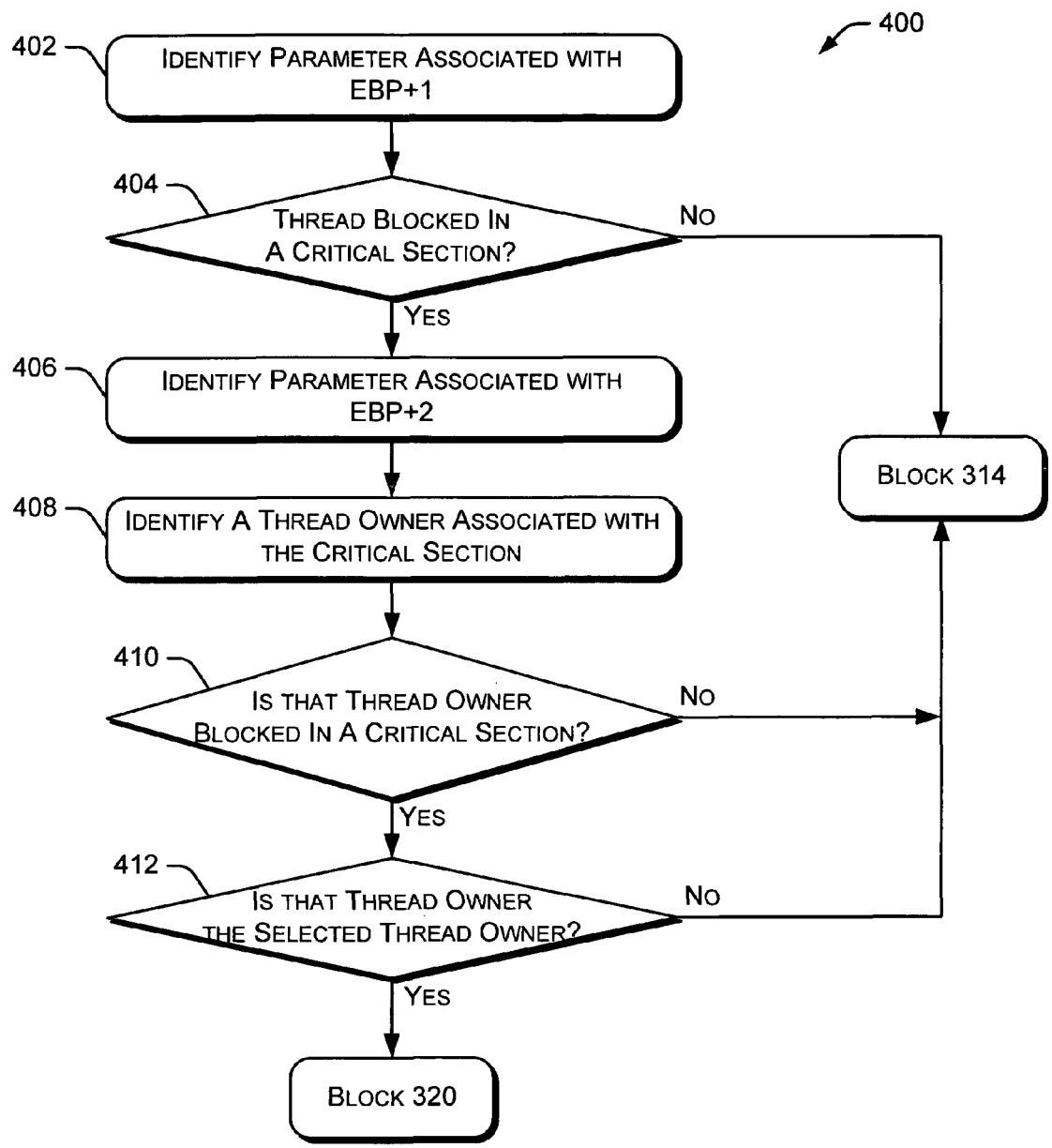
FIG. 4 is a flow diagram illustrating an embodiment of a procedure for determining whether a particular thread is deadlocked.

FIG. 4 is a flow diagram illustrating an embodiment of a procedure 400 for determining whether a particular thread is deadlocked. The procedure of FIG. 4 is represented as block 318 in FIG. 3. Initially, procedure 400 identifies a parameter associated with EBP+1 (block 402). "EBP+1" refers to the parameter following the EBP parameter. The EBP+1 parameter is a return address from a "RtlEnterCriticalSection" function call. The procedure then determines whether that thread is blocked in a critical section (block 404). For example, the procedure determines whether the return address associated with the EBP+1 parameter is within the critical section address range. If the thread is not blocked in a critical section, then the selected thread is not deadlocked and the procedure continues at block 314 of FIG. 3.

If the thread is blocked in a critical section, procedure 400 continues by identifying a parameter associated with EBP+2 (block 406). "EBP+2" refers to the parameter following the EBP+1 parameter. The EBP+2 parameter is a pointer to the critical section. Next, the procedure identifies a thread owner associated with that critical section (block 408). For example, the critical section has an associated "owner thread" field that identifies the current thread that is blocked in the associated critical section. Procedure 400 then determines whether the thread owner associated with the critical section is blocked in a critical section (block 410). This can be determined, for example, by analyzing the "owner thread" field. If the thread owner is not blocked in a critical section, then the selected thread is not deadlocked and the procedure continues at block 314 of FIG. 3.

If the thread owner is blocked in a critical section at block 410, the procedure continues by determining whether that thread owner is the selected thread owner (block 412), i.e., the owner of the thread selected in block 306 of FIG. 3. If that thread owner is not the selected thread owner, then the selected thread is not deadlocked and the procedure continues at block 314 of FIG. 3. However, if that thread owner is the selected thread owner, then the selected thread is deadlocked. In this situation, the procedure continues at block 320 of FIG. 3.

The systems and methods discussed herein detect deadlocks without intruding in the process (or processes) being monitored. For example, the systems and methods described do not detour any APIs or inject any DLLs in the process space being monitored. Instead, deadlocks are detected by reading various information from memory associated with the monitored process, for example using a ReadProcessMemory function. An example of "detouring" an API occurs when a change is made to the address information contained in an IAT (Import Address Table) associated with a process. Changing this address information causes functions to jump to the changed address instead of the actual address associated with the API. Injecting a DLL into the process space being monitored includes loading a different DLL into the monitored process space to alter operation of the process.

Figure 5:
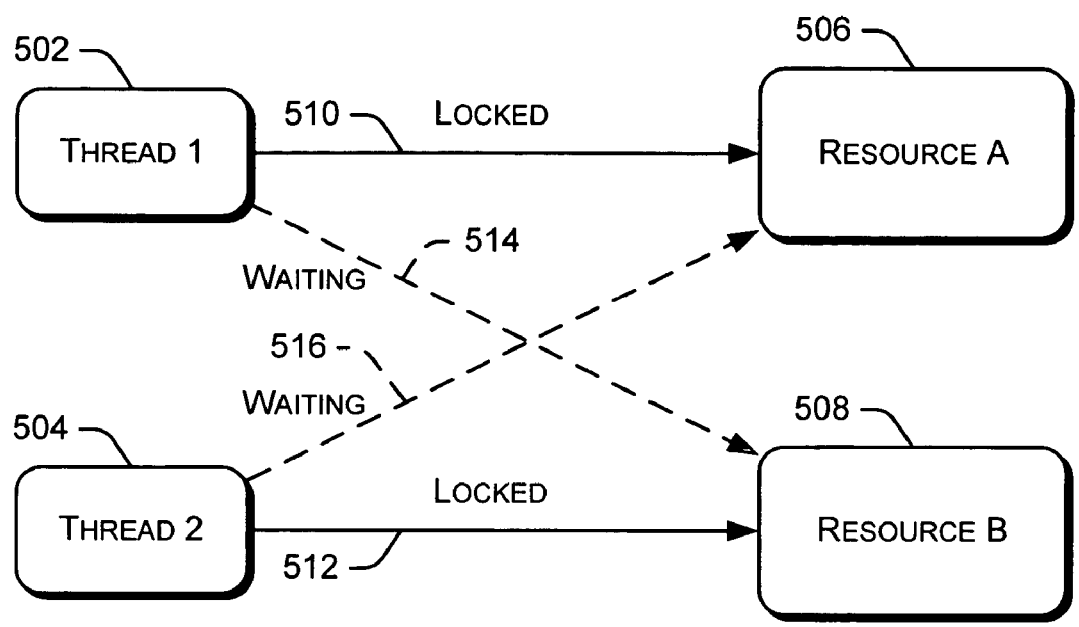
FIG. 5 illustrates an example of a deadlock condition involving two threads and two resources.

FIG. 5 illustrates an example of a deadlock condition involving two threads and two resources. A first thread 502 has established a lock on a first resource 506, indicated by solid line 510. This lock prevents other threads from accessing resource 506. Thread 502 is also waiting for access to a second resource 508, indicated by broken line 514. However, a second thread 504 has already established a lock on resource 508, indicated by solid line 512. Thus, other threads are prevented from accessing resource 508 until the lock is released. Additionally, thread 504 is waiting for access to resource 506 (indicated by broken line 516), which is locked by thread 502.

Thus, thread 502 cannot continue execution until it obtains access to resource 508. Similarly, thread 504 cannot continue execution until it obtains access to resource 506. This situation represents a deadlock condition. Thread 502 cannot continue because it cannot access resource 508. Thread 502 will not gain access to resource 508 because thread 504 has locked the resource and thread 504 cannot continue because thread 502 has locked resource 506.

Applying the procedures of FIGS. 3 and 4 discussed above, resources 506 and 508 are associated with critical sections. The procedures will identify that thread 502 has locked resource 506 and that thread 504 is waiting to access resource 508. The procedures will further identify that thread 504 has locked resource 508 and is waiting to access resource 506. When the procedures determine that thread 504 is attempting to access a resource (506) locked by thread 502, a deadlock will be identified and handled as discussed above.

The example of FIG. 5 represents a deadlock situation between two threads 502 and 504. In alternate embodiments, any number of threads may be involved in creating a deadlock condition. For example:

Thread 1 is waiting to access a resource locked by Thread 2,

Thread 2 is waiting to access a resource locked by Thread 3,

Thread 3 is waiting to access a resource locked by Thread 4, and

Thread 4 is waiting to access a resource locked by Thread 1.

In the above example, all four threads (Thread 1-Thread 4) are involved in creating the deadlock condition.

Figure 6:
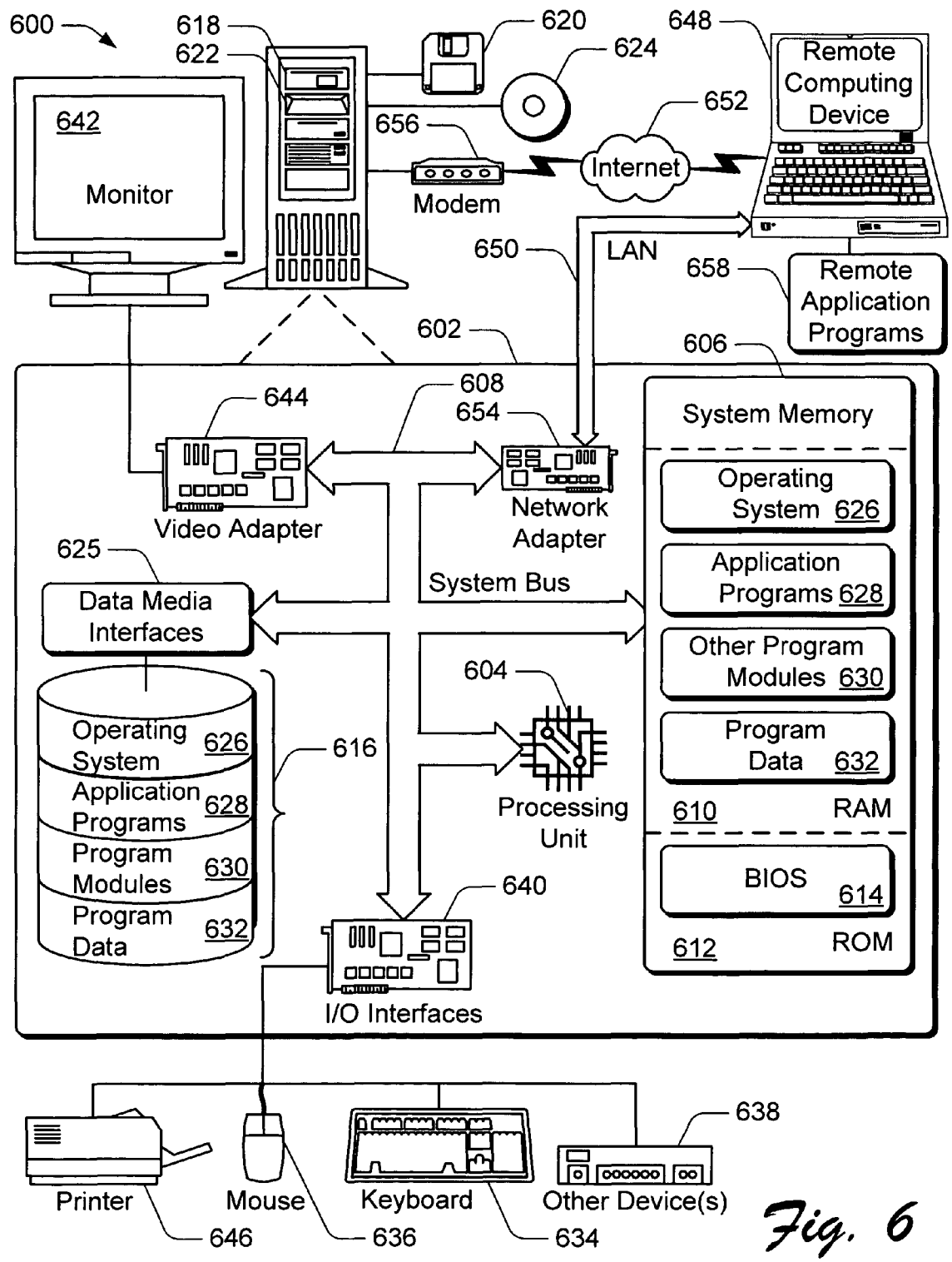
FIG. 6 illustrates a general computer environment, which can be used to implement the techniques described herein.

FIG. 6 illustrates a general computer environment 600, which can be used to implement the techniques described herein. Computer environment 600 is only one example of a computing environment and is not intended to suggest any limitation as to the scope of use or functionality of the computer and network architectures. Neither should computer environment 600 be interpreted as having any dependency or requirement relating to any one or combination of components illustrated in the example computer environment 600.

Computer environment 600 includes a general-purpose computing device in the form of a computer 602. The components of computer 602 can include, but are not limited to, one or more processors or processing units 604 (optionally including a cryptographic processor or co-processor), a system memory 606, and a system bus 608 that couples various system components including the processor 604 to the system memory 606.

System bus 608 represents one or more of any of several types of bus structures, including a memory bus or memory controller, a point-to-point connection, a switching fabric, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 602 typically includes a variety of computer readable media. Such media can be any available media that is accessible by computer 602 and includes both volatile and non-volatile media, removable and non-removable media.

System memory 606 includes computer readable media in the form of volatile memory, such as random access memory (RAM) 610, and/or non-volatile memory, such as read only memory (ROM) 612. A basic input/output system (BIOS) 614, containing the basic routines that help to transfer information between elements within computer 602, such as during start-up, is stored in ROM 612. RAM 610 typically contains data and/or program modules that are immediately accessible to and/or presently operated on by the processing unit 604.

Computer 602 may also include other removable/non-removable, volatile/non-volatile computer storage media. By way of example, FIG. 6 illustrates a hard disk drive 616 for reading from and writing to a non-removable, non-volatile magnetic media (not shown), a magnetic disk drive 618 for reading from and writing to a removable, non-volatile magnetic disk 620 (e.g., a "floppy disk"), and an optical disk drive 622 for reading from and/or writing to a removable, non-volatile optical disk 624 such as a CD-ROM, DVD-ROM, or other optical media. Hard disk drive 616, magnetic disk drive 618, and optical disk drive 622 are each connected to the system bus 608 by one or more data media interfaces 625. Alternatively, hard disk drive 616, magnetic disk drive 618, and optical disk drive 622 can be connected to the system bus 608 by one or more interfaces (not shown).

The disk drives and their associated computer-readable media provide non-volatile storage of computer readable instructions, data structures, program modules, and other data for computer 602. Although the example illustrates a hard disk 616, a removable magnetic disk 620, and a removable optical disk 624, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on hard disk 616, magnetic disk 620, optical disk 624, ROM 612, and/or RAM 610, including by way of example, an operating system 626, one or more application programs 628, other program modules 630, and program data 632. Each of such operating system 626, one or more application programs 628, other program modules 630, and program data 632 (or some combination thereof) may implement all or part of the resident components that support the distributed file system.

A user can enter commands and information into computer 602 via input devices such as a keyboard 634 and a pointing device 636 (e.g., a "mouse"). Other input devices 638 (not shown specifically) may include a microphone, joystick, game pad, satellite dish, serial port, scanner, and/or the like. These and other input devices are connected to processing unit 604 via input/output interfaces 640 that are coupled to system bus 608, but may be connected by other interface and bus structures, such as a parallel port, game port, or a universal serial bus (USB).

A monitor 642 or other type of display device can also be connected to system bus 608 via an interface, such as a video adapter 644. In addition to monitor 642, other output peripheral devices can include components such as speakers (not shown) and a printer 646 which can be connected to computer 602 via input/output interfaces 640.

Computer 602 can operate in a networked environment using logical connections to one or more remote computers, such as a remote computing device 648. By way of example, the remote computing device 648 can be a personal computer, portable computer, a server, a router, a network computer, a peer device or other common network node, game console, and the like. The remote computing device 648 is illustrated as a portable computer that can include many or all of the elements and features described herein relative to computer 602.

Logical connections between computer 602 and remote computer 648 are depicted as a local area network (LAN) 650 and a general wide area network (WAN) 652. Such networking environments are commonplace in offices, enterprise-wide computer networks, intranets, and the Internet.

When implemented in a LAN networking environment, computer 602 is connected to a local network 650 via a network interface or adapter 654. When implemented in a WAN networking environment, computer 602 typically includes a modem 656 or other means for establishing communications over the wide network 652. The modem 656, which can be internal or external to computer 602, can be connected to system bus 608 via input/output interfaces 640 or other appropriate mechanisms. It is to be appreciated that the illustrated network connections are exemplary and that other means of establishing communication link(s) between the computers 602 and 648 can be employed.

In a networked environment, such as that illustrated with computing environment 600, program modules depicted relative to computer 602, or portions thereof, may be stored in a remote memory storage device. By way of example, remote application programs 658 reside on a memory device of remote computer 648. For purposes of illustration, application programs and other executable program components such as the operating system are illustrated herein as discrete blocks, although it is recognized that such programs and components reside at various times in different storage components of computing device 602, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media" and "communications media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. A method comprising:
   identifying a plurality of threads associated with a process;
   pausing execution of a first thread associated with the process;
   determining whether the first thread is attempting to access a first resource; and
   when the first thread attempts to access the first resource:
   identifying a second thread associated with the process, wherein the second thread has locked the first resource;
   determining whether the second thread is attempting to access a second resource, wherein the second resource is locked by the first thread;
   determining whether the first thread is blocked in a critical section by examining a return address contained in a base pointer register; and
   identifying a deadlock if the second thread is attempting to access a second resource that is locked by the first thread and the first thread is blocked in the critical section.

2. A method as recited in claim 1 further comprising resuming execution of the first thread if the first thread is not attempting to access the first resource.

3. A method as recited in claim 1 further comprising when the second thread has not locked the first resource, determining whether three or more threads are involved in a deadlocked condition, wherein the three or more threads comprise a sequence of threads, wherein each thread in the sequence of threads is waiting for access to a resource locked by a prior thread in the sequence of threads, and wherein a first thread in the sequence of threads is waiting for access to a resource locked by a last thread in the sequence of threads.

4. A method as recited in claim 1 further comprising performing a memory dump if the second thread is attempting to access the second resource that is locked by the first thread.

5. A method as recited in claim 1 further comprising reporting a deadlock condition if the second thread is attempting to access the second resource that is locked by the first thread.

6. A method as recited in claim 1 wherein if the second thread is attempting to access the second resource that is locked by the first thread, the method further comprises:
   performing a memory dump;
   reporting a deadlock condition; and
   terminating the process.

7. A method as recited in claim 1 wherein determining whether the first thread is in the critical section comprises:
   determining an address range of the critical section; and
   comparing the return address to the address range, and identifying no deadlock if the return address is not within the address range.

8. A method as recited in claim 1 wherein the base pointer register is used to identify a deadlock, based on a determination of whether the return address is within an address range of the critical section.

9. A method as recited in claim 1 further comprising repeating the method for each of the plurality of threads associated with the process.

10. A method as recited in claim 1, wherein the critical section protects a section of code from being accessed by more than one thread.

11. One or more computer-readable memory devices having stored thereon a computer program that, when executed by one or more processors, causes the one or more processors to:
   determine whether a first thread in a process is associated with a critical section, and determine whether the first thread is blocked in the critical section by examining a return address contained in a base pointer register;
   if the first thread is blocked in the critical section:
      identify a second thread associated with the process; and
      determine whether the second thread has locked a first resource associated with the critical section;
   if the second thread has locked the first resource associated with the critical section:
      determine whether the second thread is attempting to access a second resource that is locked by the first thread; and
      if the second thread is attempting to access the second resource that is locked by the first thread, then identify a deadlock if the first thread is attempting to access a first resource that is locked by the second thread and if the first thread is blocked in the critical section; and
   if the second thread has not locked the first resource, then determine if three or more threads are involved in a deadlocked condition, wherein the three or more threads comprises a sequence of threads, wherein each thread in the sequence of threads is waiting for access to a resource locked by a prior thread in the sequence of threads, and wherein a first thread in the sequence of threads is waiting for access to a resource locked by a last thread in the sequence of threads.

12. One or more computer-readable memory devices as recited in claim 11 wherein the one or more processors further perform a memory dump if the second thread is attempting to access the second resource that is locked by the first thread.

13. One or more computer-readable memory devices as recited in claim 11 wherein the one or more processors further report a deadlock condition if the second thread is attempting to access the second resource that is locked by the first thread.

14. One or more computer-readable memory devices as recited in claim 11 wherein the one or more processors further terminate the process if the second thread is attempting to access the second resource that is locked by the first thread.

15. One or more computer-readable memory devices as recited in claim 11 wherein the critical section protects a section of code from being accessed by more than one thread.

16. One or more computer-readable memory devices as recited in claim 11 wherein if the first thread is not associated with the critical section, then indicate that no deadlock is present.

17. An apparatus comprising:
   a processor;
   a memory, on which are stored processor executable instructions, which when executed by the processor define a first resource and a second resource; and
   a deadlock detector coupled to the first and second resources, wherein the deadlock detector identifies multiple threads executing on the apparatus and determines whether a first thread is attempting to access the first resource and whether the first resource is locked by the second thread, and wherein if the first thread is attempting to access the first resource and the first resource is locked by the second thread, the deadlock detector: determines whether the second thread is attempting to access the second resource and if the second resource is locked by the first thread, determines whether the first thread is blocked in a critical section by examining a return address contained in a base pointer register, and identifies a deadlock if the second thread is attempting to access the second resource and the second resource is locked by the first thread and if the first thread is blocked in the critical section.

18. An apparatus as recited in claim 17 wherein the deadlock detector further initiates a memory dump if the second thread is attempting to access a second resource that is locked by the first thread.

19. An apparatus as recited in claim 17 wherein if the second thread is attempting to access a second resource that is locked by the first thread, the deadlock detector further:
   initiates a memory dump;
   reports a deadlock condition; and
   terminates a process associated with the first thread.

20. An apparatus as recited in claim 17 wherein the base pointer register is used to identify a deadlock, based on a determination of whether the return address in the base pointer register is within an address range of the critical section.

* * * * *